(12) United States Patent
Soto

(10) Patent No.: US 10,295,118 B2
(45) Date of Patent: May 21, 2019

(54) GREASE GUN SLEEVE THAT CAPTURES DROOL AND PREVENTS CONTAMINATION

(71) Applicant: Alberto Soto, Pembroke Pines, FL (US)

(72) Inventor: Alberto Soto, Pembroke Pines, FL (US)

( * ) Notice: Subject to any disclaimer, the term of this patent is extended or adjusted under 35 U.S.C. 154(b) by 266 days.

(21) Appl. No.: 15/468,488

(22) Filed: Mar. 24, 2017

(65) Prior Publication Data

US 2018/0274723 A1 Sep. 27, 2018

(51) Int. Cl.
*F16N 3/12* (2006.01)
*F16N 21/06* (2006.01)

(52) U.S. Cl.
CPC .............. *F16N 21/06* (2013.01); *F16N 3/12* (2013.01)

(58) Field of Classification Search
CPC .............. F16N 3/12; F16N 5/02; F16N 21/06
See application file for complete search history.

(56) References Cited

U.S. PATENT DOCUMENTS

| | | | | |
|---|---|---|---|---|
| 4,795,432 A | * | 1/1989 | Karczmer | ........... A61M 5/3257 604/110 |
| 5,053,017 A | * | 10/1991 | Chamuel | ............ A61M 5/3273 604/192 |
| 2003/0144627 A1 | * | 7/2003 | Woehr | ............... A61M 5/3273 604/110 |
| 2012/0267890 A1 | * | 10/2012 | Gurney | ................. F16L 37/138 285/308 |

* cited by examiner

*Primary Examiner* — Minh Truong
(74) *Attorney, Agent, or Firm* — Ruben Alcoba, Esq.

(57) ABSTRACT

A grease gun sleeve that comprises of an elongated semicircular body that has a first and second end, the first end has a flattened neck and the second a semicircular neck. A nylon or polyester stretchable material covers the elongated semicircular body to form a tube sleeve. The tube sleeve forms a first and a second end. The tube sleeve has closing means sewn, heat pressed or molded on the ends. In preferred embodiments, the closing means will be an elastic or rubber band that is placed adjacent to the ends. The grease gun sleeve has two pull tabs attached to the ends of the tube sleeve that allow the grease gun sleeve to be manipulated when placed on the hose of a grease gun. The grease gun sleeve is used by first placing the semicircular neck end over the nozzle and hose of a grease gun, then sliding the grease gun sleeve on the hose in a first direction so that the sleeve is fully mounted on the hose, this is the uncovered position, then skidding the grease gun sleeve in a second direction until the flattened neck is past the nozzle so that the closing means rests within the groove of the present invention, the covered position.

6 Claims, 3 Drawing Sheets

GREASE GUN SLEEVE THAT CAPTURES DROOL AND PREVENTS CONTAMINATION

BACKGROUND

The present invention is directed to a grease gun sleeve that is placed over the nozzle and hose of a grease gun to capture grease drool and prevents contamination.

All industries with mechanized equipment require lubrication. Many of these industries are regulated. Therefore, for the purpose of this summary, aviation will be utilized.

In the aviation industry, safety is the key to safe travel. The industry is heavily regulated and maintenance is key. Shops that repair and maintain airplanes must adhere to safety regulations that instruct them as to how they must store materials, equipment, and solvents, for the contamination of solvents used on airplanes can lead to failures of aircraft systems.

One requirement that must be adhered to is the maintenance of grease guns. Nozzles of grease guns must be sealed when not in use. Often this does not happen after the grease guns first use. The reason is that the guns normally come with an end cap that is held by a ring and clip attachment means that are used adjacent to the nozzle to seal the nozzles of grease guns. The ring and clip cap attachment means are a nuisance to the technicians using the guns in the field and often are removed by the technicians.

After the removal of the ring and clip cap attachments, the nozzles are often not properly caped or sealed. Technicians in shops, often place bags with rubber bands on the nozzle ends of grease guns to prevent drool in shops. Sometimes they even hang the guns without placing a sealing means on the nozzle ends, a violation to FAA rules, for not sealing the nozzle end can lead to contamination of the grease or fluid spills below the grease guns.

The inventor of the present invention conceived a device that can be placed on the hose of the nozzle of a grease gun. The device can be slid from one position that allows the end of a nozzle to be covered and to a second position that allows the end to be uncovered. The device prevents drool and contamination when in the covered position. When the device is in the uncovered position, it hugs the hose of the gun and it does not present a nuisance to the technician.

There is a need in the airline lubrication industry for a device that can be placed over the nozzle of a grease gun to capture drool and prevent contamination.

SUMMARY

The present invention is a sleeve that is placed on the hose of a grease gun that captures drool and prevents contamination of the contents of the grease gun.

The grease gun sleeve of the present invention comprises of an elongated semicircular body that has a first and second end, the first end has a flattened neck and the second a semicircular neck. A nylon or polyester stretchable material covers the elongated semicircular body to form a tube sleeve. The tube sleeve forms a first and a second end. The tube sleeve has closing means sewn, heat pressed or molded on the ends. In preferred embodiments, the closing means will be an elastic or rubber band that is placed adjacent to the ends.

In an embodiment of the present invention, the flattened neck will define a groove in which the closing means will rest when the grease gun sleeve is not fully placed over the hose of a grease gun.

In another preferred embodiment, there are two pull tabs attached to the ends of the tube sleeve that allow the grease gun sleeve to be manipulated when placed on the hose.

The grease gun sleeve of the present invention is used by first placing the semicircular neck end over the nozzle and hose of a grease gun, then sliding the grease gun sleeve on the hose in a first direction so that the sleeve is fully mounted on the hose, this is the uncovered position, then skidding the grease gun sleeve in a second direction until the flattened neck is past the nozzle so that the closing means rests within the groove of the present invention, the covered position.

An object of the present invention is to provide a grease gun sleeve that will capture grease drool.

Another object of the present invention is to provide a grease gun sleeve that will prevent contamination of the contents within a grease gun.

Yet another object of the present invention is to provide a grease gun sleeve that will promote safety within airline maintenance shops.

Still another object of the present invention is to provide technicians with a grease gun sleeve that will encourage the proper sealing of grease guns after their use.

DRAWINGS

These and other features, aspects, and advantages of the present invention will become better understood with regard to the following description, appended claims, and drawings where:

Figure 1:
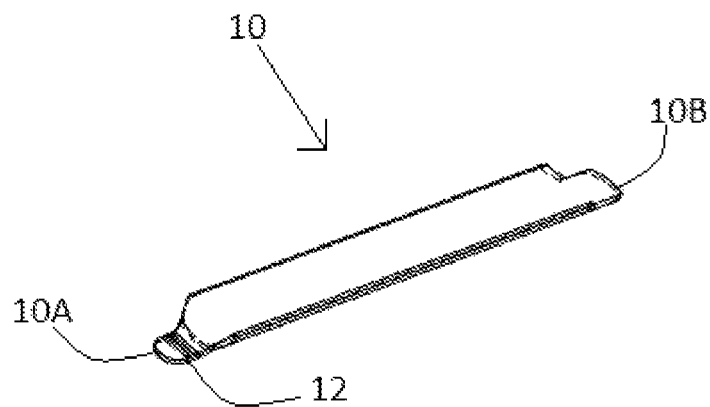
FIG. 1 is a perspective view of an elongated semicircular body of a grease gun sleeve of the present invention.
Figure 2:
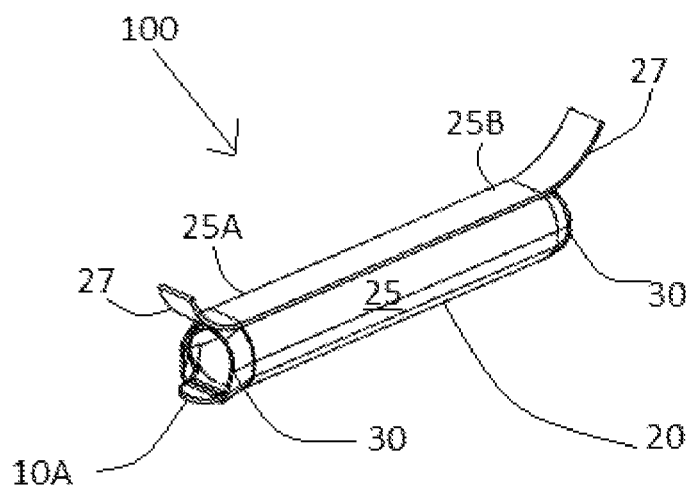
FIG. 2 is a perspective view of the grease gun sleeve of the present invention.
Figure 3:
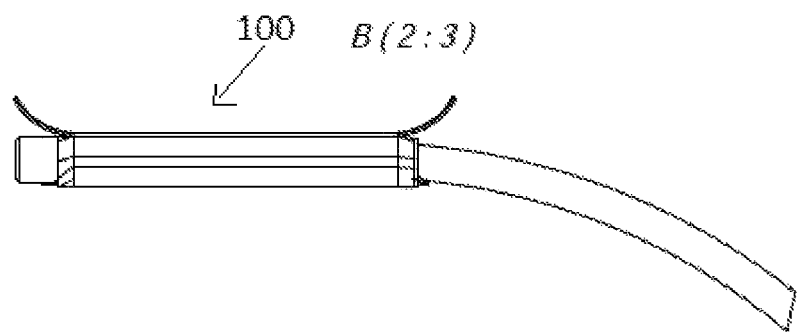
Figure 4:
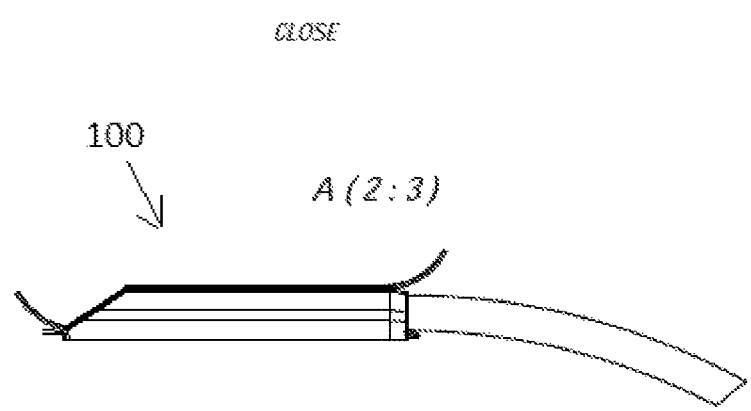
Figure 5:
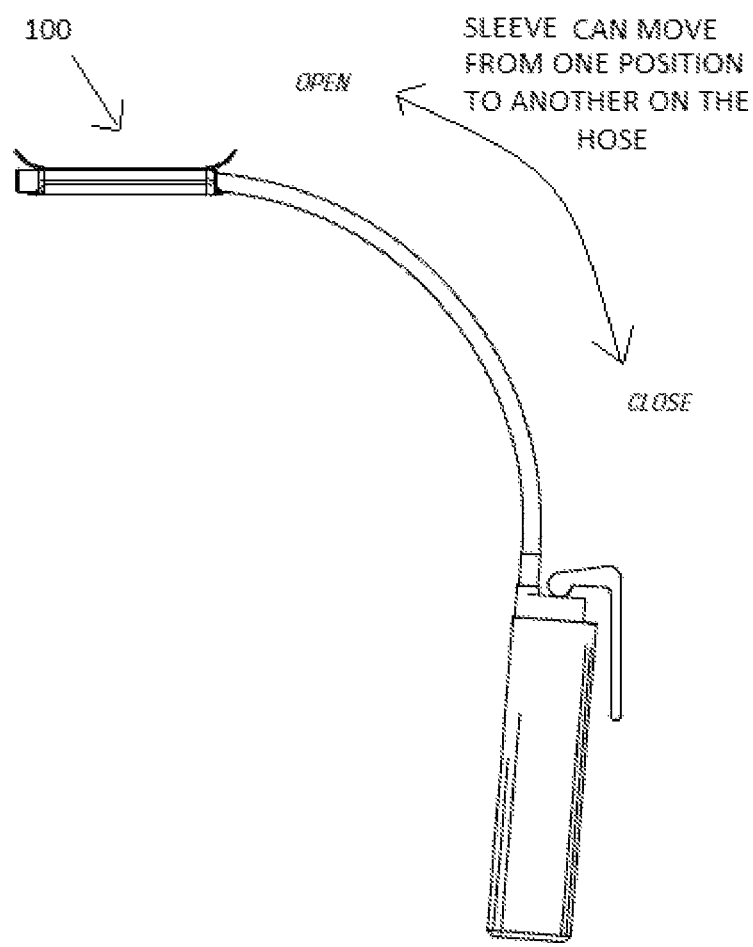

FIG. 3 a side view of the present invention mounted on a nozzle and hose (cut away from the grease gun) of a grease gun in the open position;

FIG. 4 is a side view of the present invention mounted on a nozzle and hose (cut away from the grease gun) of a grease gun in the closed position; and FIG. 5 is a side view of the present invention mounted on a nozzle and hose of a grease gun in the open position.

DESCRIPTION

As seen in FIGS. 1-5, the present invention is a grease gun sleeve 100 that is used to seal the end of a grease nozzle hose. The grease gun sleeve 100 comprises an elongated semicircular body 10 that has a first end 10A and second end 10B, the first end has a flattened neck 10A and the second a semicircular neck 10B. The elongated semicircular body 10 is fixedly covered by a nylon or polyester stretchable material 20 to form a tube sleeve 25. The tube sleeve 25 has a first 25A and a second end 25B. The tube sleeve 25 has closing means 27 sewn, heat pressed or molded adjacent to the ends 25A-25B of the tube sleeve 25. In preferred embodiments, the closing means will be an elastic or rubber band 27 that will be placed on the ends.

In an embodiment of the present invention, the flattened neck 10A will define a groove 12 in which the closing means 27 will rest when the grease gun sleeve 100 is not fully placed over the hose of a grease gun service nozzle.

In another preferred embodiment, there are two pull tabs 30 attached to the ends of the tube sleeve 25A-25B that allow the grease gun sleeve to be manipulated when placed on the hose.

The present invention is used as follows: 1. Providing a grease gun sleeve as defined above; 2. Providing a grease gun that has a hose and a nozzle; 3. Placing the semicircular neck end of the grease gun sleeve over the nozzle and hose of the grease gun; 4. Sliding the grease gun sleeve on the hose in a first direction so that the sleeve is fully mounted on the hose, this is the uncovered position; 5. and then, sliding the grease gun sleeve in a second direction until the flattened neck is past the nozzle so that the closing means rests within the groove of the present invention, the covered position. In use, the user may manipulate the sleeve to rest adjacent to the length of the hose that connects to the grease gun.

In the aviation industry, proper use of a hose requires the hose to be wiped down after each use.

An advantage of the present invention is that it provides a grease gun sleeve that captures grease drool.

Another advantage of the present invention is that it provides a grease gun sleeve that prevents contamination of the contents within a grease gun.

Yet another advantage of the present invention is that it provides a grease gun sleeve that promotes safety in airline maintenance shops.

Still another advantage of the present invention is that it provides technicians with a grease gun sleeve that encourages the proper sealing of grease guns after their use.

While the inventor's above description contains many specificities, these should not be construed as limitations on the scope, but rather as an exemplification of several preferred embodiments thereof. Accordingly, the scope should not be determined by the embodiments illustrated, but by the appended claims and their legal equivalents.

What is claimed is:

1. A grease gun sleeve that is used to seal an end of a grease nozzle hose, the grease gun sleeve comprises:
    an elongated semicircular body that has a first end and a second end, the first end has a flattened neck and the second end has a semicircular neck;
    a stretchable material attaches to the elongated semicircular body and forms a tube sleeve, the tube sleeve has a first end and a second end, the tube sleeve extending and covering a length of the semicircular body from the flattened neck to the semicircular neck;
    a pair of elastic closing means that are fixedly attached and are adjacent to the ends of the tube sleeve; and
    a pair of pull tabs that are fixedly attached to the ends of the tube sleeve.

2. The grease gun sleeve of claim 1, wherein the flattened neck defines a groove in which one of the elastic closing means rests when the grease gun sleeve is not fully placed over a hose of a grease gun.

3. The grease gun sleeve of claim 2, wherein the closing means is a rubber band.

4. The grease gun sleeve of claim 2, wherein the stretchable material is nylon.

5. The grease gun sleeve of claim 2, wherein the stretchable material is a polymer.

6. A method of using the grease gun sleeve of claim 1, the method comprising:
    providing a grease gun sleeve;
    providing a grease gun that has a hose and a nozzle;
    placing a semicircular neck end of the grease gun sleeve over the nozzle and hose of the grease gun;
    sliding the grease gun sleeve on the hose in a first direction so that the sleeve is fully mounted on the hose to form an uncovered position; and
    then, sliding the grease gun sleeve in a second direction until the flattened neck is past the nozzle so that the closing means rests within the groove of the present invention to form a covered position.

* * * * *